United States Patent
Li et al.

(10) Patent No.: US 9,894,504 B2
(45) Date of Patent: Feb. 13, 2018

(54) EMERGENCY CALL SUPPORT FOR VOLTE ROAMING WITHIN S8 HOME ROUTING ARCHITECTURE

(71) Applicant: Verizon Patent and Licensing Inc., Arlington, VA (US)

(72) Inventors: Mingxing S. Li, San Jose, CA (US); Priscilla Lau, Fremont, CA (US); Xuming Chen, San Ramon, CA (US); Ce Xu, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/953,949

(22) Filed: Nov. 30, 2015

(65) Prior Publication Data

US 2017/0156043 A1 Jun. 1, 2017

(51) Int. Cl.
*H04W 4/22* (2009.01)
*H04M 15/00* (2006.01)
*H04W 76/02* (2009.01)

(52) U.S. Cl.
CPC ............ *H04W 4/22* (2013.01); *H04M 15/57* (2013.01); *H04W 76/021* (2013.01)

(58) Field of Classification Search
CPC ....... H04W 4/22; H04W 76/007; H04W 4/02; H04W 76/00; H04W 76/02; H04W 76/021; H04W 76/027; H04W 76/04; H04W 76/046; H04W 72/1247; H04W 40/30; H04W 12/00; H04W 12/06; H04W 8/22; H04W 8/26; H04W 88/18; H04W 8/04; H04M 3/5116; H04M 15/57; H04M 15/00; H04M 2215/208; H04Q 2213/1337
See application file for complete search history.

(56) References Cited

U.S. PATENT DOCUMENTS

| | | | |
|---|---|---|---|
| 9,106,382 B1 | 8/2015 | Ray | |
| 9,369,569 B1 * | 6/2016 | Lam | H04M 15/55 |
| 2007/0060097 A1 * | 3/2007 | Edge | H04L 29/06027 |
| | | | 455/404.1 |
| 2008/0153453 A1 * | 6/2008 | Bachmutsky | H04W 4/22 |
| | | | 455/404.1 |
| 2010/0029273 A1 | 2/2010 | Bennett | |
| 2010/0124897 A1 * | 5/2010 | Edge | H04M 7/123 |
| | | | 455/404.1 |
| 2012/0094627 A1 * | 4/2012 | Suh | H04W 4/22 |
| | | | 455/404.1 |
| 2012/0135713 A1 | 5/2012 | Lee et al. | |
| 2013/0052981 A1 | 2/2013 | Zarri et al. | |
| 2014/0162676 A1 * | 6/2014 | Shaw | H04W 76/00 |
| | | | 455/452.2 |
| 2014/0171049 A1 * | 6/2014 | Mallikarjunan | H04W 4/16 |
| | | | 455/417 |
| 2015/0094026 A1 | 4/2015 | Martin | |

(Continued)

*Primary Examiner* — Meless Zewdu

(57) ABSTRACT

A method, a device, and a non-transitory storage medium provide an emergency call support service in which a network device of a visited network obtains user profile data of a wireless device from a home network of the wireless device, and provides the user profile data to a location server of the visited network. The emergency call support service allows an emergency call, when initiated by a roaming subscriber of the wireless device via the visited network, to include the user profile data and be provided to a public safety access point.

20 Claims, 13 Drawing Sheets

(56) References Cited

U.S. PATENT DOCUMENTS

| | | | |
|---|---|---|---|
| 2015/0281929 A1* | 10/2015 | Shih | H04W 4/22 |
| | | | 455/404.1 |
| 2016/0100435 A1* | 4/2016 | Bakker | H04M 3/42348 |
| | | | 455/404.1 |
| 2016/0227391 A1 | 8/2016 | Tanaka et al. | |
| 2016/0278132 A1* | 9/2016 | Baek | H04W 8/02 |
| 2016/0345149 A1* | 11/2016 | Chuttani | H04W 4/22 |
| 2016/0381657 A1* | 12/2016 | Blanchard | H04W 8/183 |
| | | | 455/427 |
| 2017/0055141 A1* | 2/2017 | Kim | H04W 4/22 |
| 2017/0099614 A1 | 4/2017 | Mahmood | |

* cited by examiner

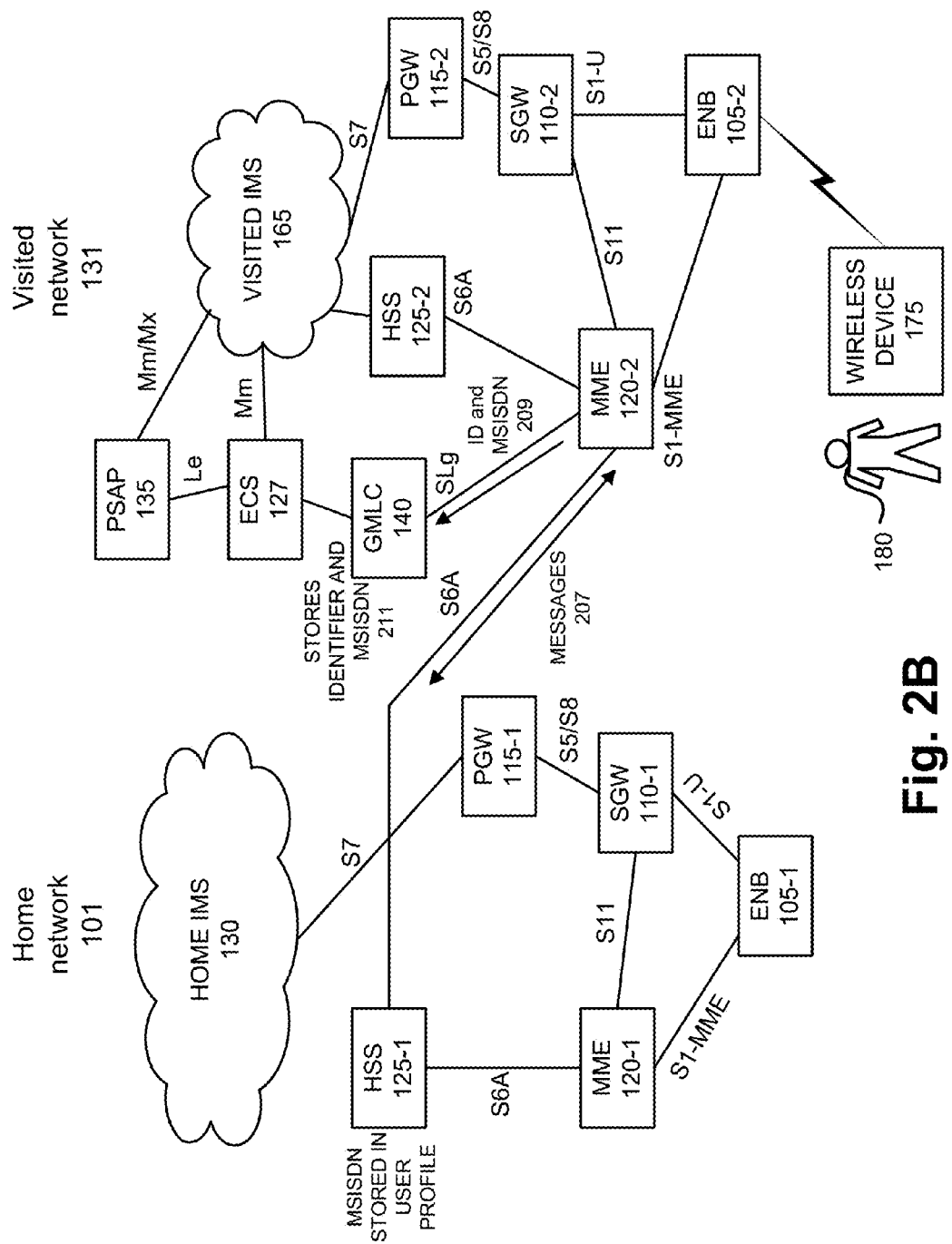

EMERGENCY CALL SUPPORT FOR VOLTE ROAMING WITHIN S8 HOME ROUTING ARCHITECTURE

BACKGROUND

Long Term Evolution (LTE) Service providers that provide Voice over LTE (VoLTE) wish to offer the VoLTE service to their subscribers not only in the subscribers' home country but also in a visited network. For example, when the subscriber roams into a visited network that does not offer LTE coverage, the subscriber may fall back to a circuit-switched (CS) technology afforded by a second generation (2G) network or a third generation (3G) network.

BRIEF DESCRIPTION OF THE DRAWINGS

FIGS. 2A-2J are diagrams that illustrate exemplary processes pertaining to the emergency call support service;

DETAILED DESCRIPTION OF PREFERRED EMBODIMENTS

Figure 1:
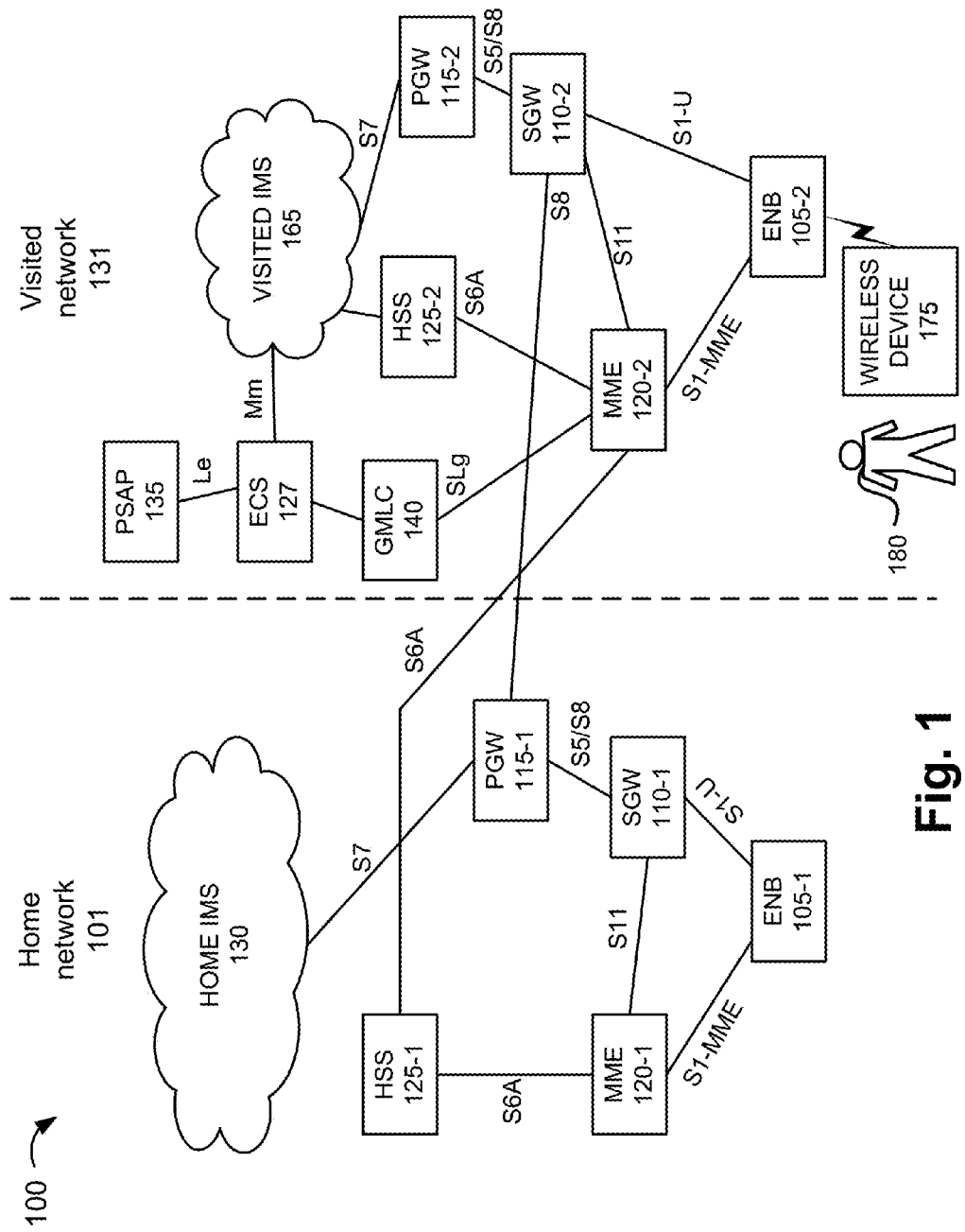
FIG. 1 is a diagram illustrating an exemplary environment in which exemplary embodiments of an emergency call support service may be implemented.

The following detailed description refers to the accompanying drawings. The same reference numbers in different drawings may identify the same or similar elements. Also, the following detailed description does not limit the invention.

According to a Third Generation Partnership Project (3GPP) technical report (e.g., TR 23.749 0.01.0; Release 14), a new architecture called S8 Home Routing (also referred to as S8HR) has been proposed directed to VoLTE roaming. As with any new architecture, S8HR must meet certain regulatory requirements, such as lawful interception and data retention, as well as support for emergency calls. The S8HR architecture does not use local breakout (LBO) but uses a Packet Date Network Gateway (PGW) of a Home Public Land Mobile Network (HPLMN) as an Internet Protocol Multimedia Subsystem (IMS) Access Point Name (APN) rather than a network device of a Visitor Public Land Mobile Network (VPLMN). Additionally, the S8HR architecture does not provide a Network-to-Network Interface (NNI) between network elements of a home IMS and a visited IMS.

According to an exemplary implementation of the S8HR architecture, the home IMS is used for VoLTE calls while the visited IMS is used for emergency calls since emergency calls are to be connected to local emergency services. However, in an emergency call context, the visited IMS is unable to obtain the Mobile Station International Subscriber Directory Number (MSISDN) of the visiting user equipment (UE) placing the emergency call (e.g., a 911 call) because there is not an NNI between the visited IMS and a Home Subscriber Server (HSS) of a home IMS. Consequently, the visited IMS is unable to communicate the MSISDN of the visiting UE to an emergency call server (ECS) and the ECS is unable to communicate a callback number to a Public Safety Access Point (PSAP). As a result, if the emergency call is disconnected for any reason, the PSAP will not have a callback number so as to re-establish the emergency call with the visiting UE/visiting user.

According to an exemplary embodiment, an emergency call support service is provided, as described herein. According to an exemplary embodiment of the emergency call support service, when a visiting UE attaches to a visited network, a visited mobility management entity (MME) obtains user profile data from the HSS of a home network of the visiting UE. The user profile data includes the MSISDN of the visiting UE/visiting user. According to various embodiments, the visiting MME provides the user profile data to one or multiple location servers of the visiting network. According to an exemplary implementation, the visiting MME provides the user profile data to the location server during attachment of the visiting UE. According to another exemplary implementation, the visiting MME provides the user profile data to the location server in response to an emergency call being initiated by the visiting UE. According to yet another exemplary implementation, the visiting MME provides the user profile data to the location server in response to a query from the location server. According to various implementations, the user profile data may be provided to the location server via a push method, via a pull method, and so forth, as described herein.

According to an exemplary embodiment of the emergency call support service, during emergency call establishment, in addition to obtaining location data, an ECS queries the location server to obtain the user profile data, which includes the MSISDN of the visiting UE and/or visiting user. According to an exemplary embodiment, the ECS provides the user profile data and the location data to a PSAP.

In view of the foregoing, the emergency call support service allows an emergency call with callback data, which is initiated from a roaming VoLTE subscriber, to be established and maintained in the S8HR architecture.

FIG. 1 is a diagram illustrating an exemplary environment 100 in which exemplary embodiments of an emergency call support service may be implemented. As illustrated, environment 100 includes a home network 101 and a visited network 131. Environment 100 further includes a wireless device 175 and a user 180.

Home network 101 includes an evolved Node B (eNB 105-1), a serving gateway (SGW) 110-1, a PGW 115-1, an MME 120-1, an HSS 125, and a home IMS 130. Visited network 131 includes an eNB 105-2, an SGW 110-2, a PGW 115-2, an MME 120-2, an HSS 125-2, an ECS 127, a PSAP 135, a Gateway Mobile Location Center (GMLC) 140, and a visited IMS 165.

ENB 105-1 is a network element of an exemplary home access network. ENB 105-2 is a network element of an exemplary visited access network. For example, the home and visited access networks may be implemented as an Evolved Universal Mobile Telecommunications System (UMTS) Terrestrial Radio Access Network (E-UTRAN) of an LTE network or an LTE-Advanced network.

SGW 110-1, PGW 115-1, MME 120-1, and HSS 125-1 are network elements of an exemplary home Evolved Packet Core (EPC). SGW 110-2, PGW 115-2, MME 120-2, and HSS 125-2 are network elements of an exemplary visited Evolved Packet Core (EPC). The network elements of the home and visited access networks and EPCs may operate according to a 3GPP specification. Additionally, as illustrated, communicative links exist between these network elements based on various interfaces (e.g., S1-MME, S1-U, etc.).

Home IMS 130 and visited IMS 165 each includes network elements of an IMS system. For example, although not illustrated, home IMS 130 and visited IMS 165 may include a Proxy Call Session Control Function (P-CSCF), an Interrogating-CSCF (I-CSCF), a Serving-CSCF (S-CSCF), an Emergency-CSCF (E-CSCF), and so forth. Also, according to an exemplary embodiment, there is no NNI between home IMS 130 and visited IMS 165.

ECS 127 includes a route determination function that routes an emergency call (e.g., a VoLTE 9-1-1 call) to a PSAP (e.g., PSAP 135). ECS 127 includes a location retrieval function to obtain an emergency caller's location. For example, ECS 127 may obtain various types of location data having varying levels of granularity (e.g., cell identifier, Global Positioning System (GPS) coordinates (e.g., latitude, longitude), etc.). According to an exemplary embodiment, ECS 127 includes a callback retrieval function that obtains an emergency caller's MSISDN. According to an exemplary embodiment, ECS 127 queries a location server (e.g., GMLC 140) for the MSISDN of wireless device 175/user 180. For example, the query may include an identifier of wireless device 175 (e.g., an International Mobile Station Equipment Identity (IMEI)) and/or an identifier of user 180 (e.g., International Mobile Subscriber Identity (IMSI)). ECS 127 provides the MSISDN and an identifier (e.g., IMEI, IMSI, etc.) to PSAP 135.

PSAP 135 is a call center responsible for answering calls to an emergency telephone number. For example, PSAP 135 includes handling VoLTE 9-1-1 calls. GMLC 140 provides location-based services pertaining to mobile devices. Additionally, as illustrated, communicative links exist between ECS 127, PSAP 135, and GMLC 140 based on various interfaces (e.g., Mm, Le, SLg, etc.).

Wireless device 175 includes a communicative and computational device that allows user 180 to place an emergency call. According to an exemplary embodiment, wireless device 175 operates according to a 3GPP LTE or LTE-A standard. Wireless device 175 may be implemented as a mobile device or a portable device. By way of example, wireless device 175 may be implemented as a smartphone, a tablet, a phablet, a netbook, a vehicular communication system within a vehicle, or a wearable device. Wireless device 175 may store one or multiple applications. For example, wireless device 175 may include a telephone application, a multi-media application, an e-mail application, a contacts application, a calendar application, an instant messaging application, a web browsing application, a location-based application (e.g., a Global Positioning System (GPS)-based application, etc.), a social networking application, a camera application, a toolbar application, and so forth. User 180 is an operator of wireless device 175.

The number of network elements, the number of networks, and the arrangement in environment 100 are exemplary. According to other embodiments, environment 100 may include additional network elements and/or differently arranged network elements than that illustrated in FIG. 1. Additionally, or alternatively, according to other embodiments, multiple network elements may be implemented on a single network device, and conversely, a network element may be implemented on multiple devices. Additionally, or alternatively, environment 100 may include an additional network and/or arrangement of networks that is different from that illustrated in FIG. 1.

A communicative link between devices may be direct or indirect and may involve an intermediary device and/or an intermediary network not illustrated in FIG. 1. For example, a communicative connection between wireless device 175 and eNB 105-2 may be indirect and involve other types of wireless nodes, such as a home eNB, a pico base station, a femto device, a relay station, etc. Additionally, the number and the arrangement of the links are exemplary.

FIGS. 2A-2J are diagrams illustrating exemplary embodiments of the emergency call support service. According to an exemplary scenario, referring to FIG. 2A, assume wireless device 175 initiates an attachment procedure with visited network 131 via eNB 105-2. The attachment procedure may include a random access procedure and a radio resource control (RRC) connection establishment procedure. After an RRC connection is established, an authentication procedure begins. For example, wireless device 175 transmits authentication and security-related messages 205 to MME 120-2 via eNB 105-2. Authentication/security messages 205 may include an IMEI and an IMSI. In turn, MME 120-2 and HSS 125-1 exchange messages 207. For example, MME 120-2 transmits an Authentication Information Request to HSS 125-1. In response, HSS 125-1 transmits an Authentication Information Answer to MME 120-2. According to an exemplary embodiment, MME 120-2 obtains the MSISDN pertaining to user 180 from HSS 125-1.

Referring to FIG. 2B, according to one exemplary implementation, MME 120-2 transmits an identifier (e.g., IMEI and/or IMSI) and the MSISDN of user 180 to GMLC 140, in response to obtaining the MSISDN (illustrated as ID and MSISDN 209), even though an emergency call has not been initiated by user 180. Depending on the number and configuration of GMLCs 140, MME 120-2 may transmit the identifier and the MSISDN to a single GMLC 140 or to multiple GMLCs 140. For example, when there are multiple GMLCs 140, MME 120-2 may transmit (e.g., broadcast or individually transmit) the identifier and the MSISDN to multiple GMLCs 140. According to another example, there may be multiple GMLCs 140, however, MME 120-2 may transmit the identifier and the MSISDN to a single GMLC 140. For example, a configuration of GMLCs 140 may be such that they can communicate with each other. Thus, the single GMLC 140 may pass the identifier and the MSISDN to one or multiple other GMLCs 140. According to yet another example, when there are multiple GMLCs 140, MME 120-2 may transmit the identifier and the MSISDN to a single GMLC 140. However, according to this example, a configuration may be such that they cannot communicate with each other. In view of this configuration, ECS 127 may query multiple GMLCs 140 in order to obtain the MSISDN from the single GMLC 140, as described further below. Of course, when there is only one GMLC 140, MME 120-1 may transmit the identifier and the MSISDN to the only available GMLC 140. According any of the examples described, GMLC 140 stores the identifier and the MSISDN (illustrated as stores identifier and MSISDN 211) in a database or a data structure.

Figure 2A:
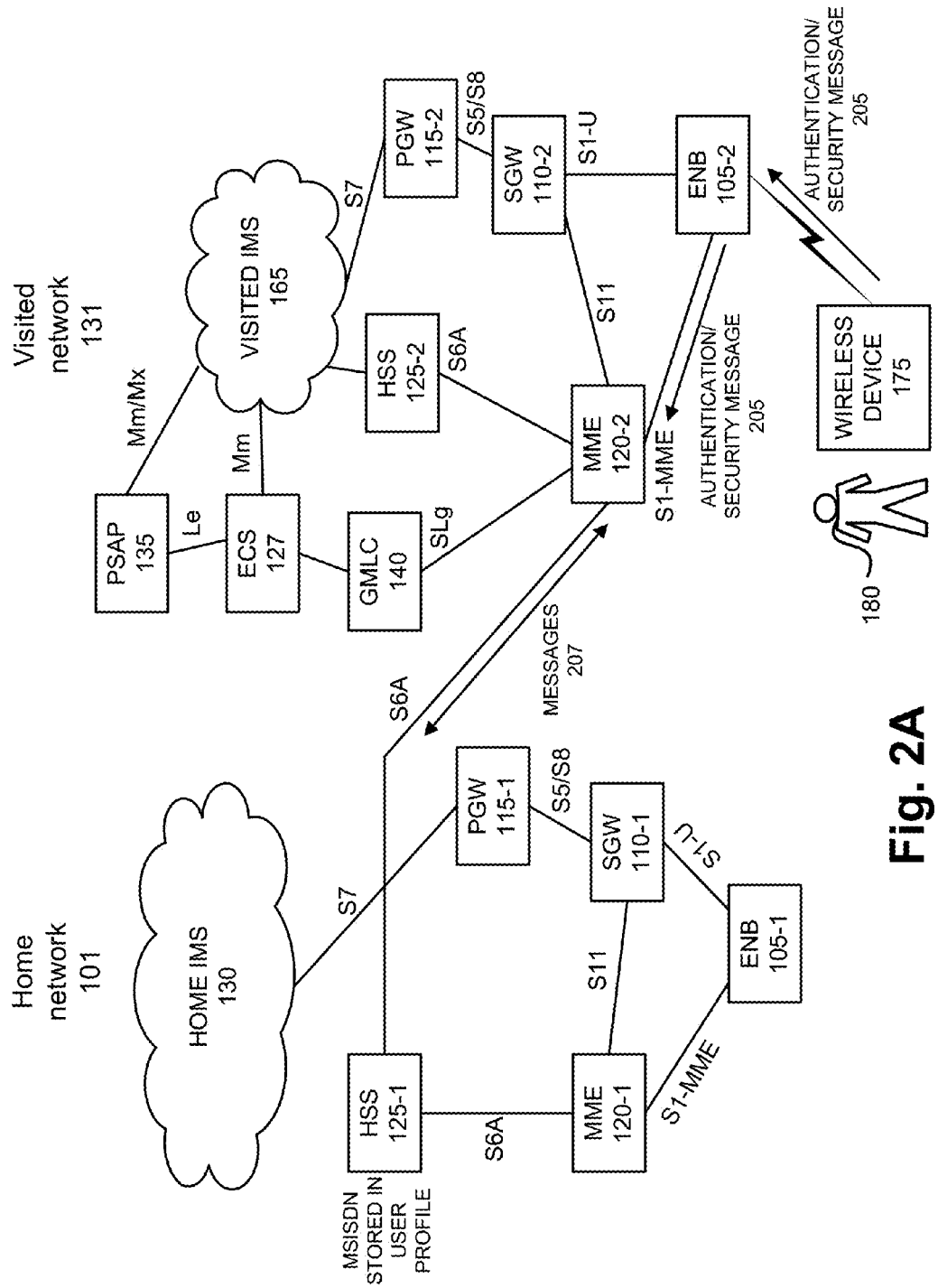
Figure 2C:
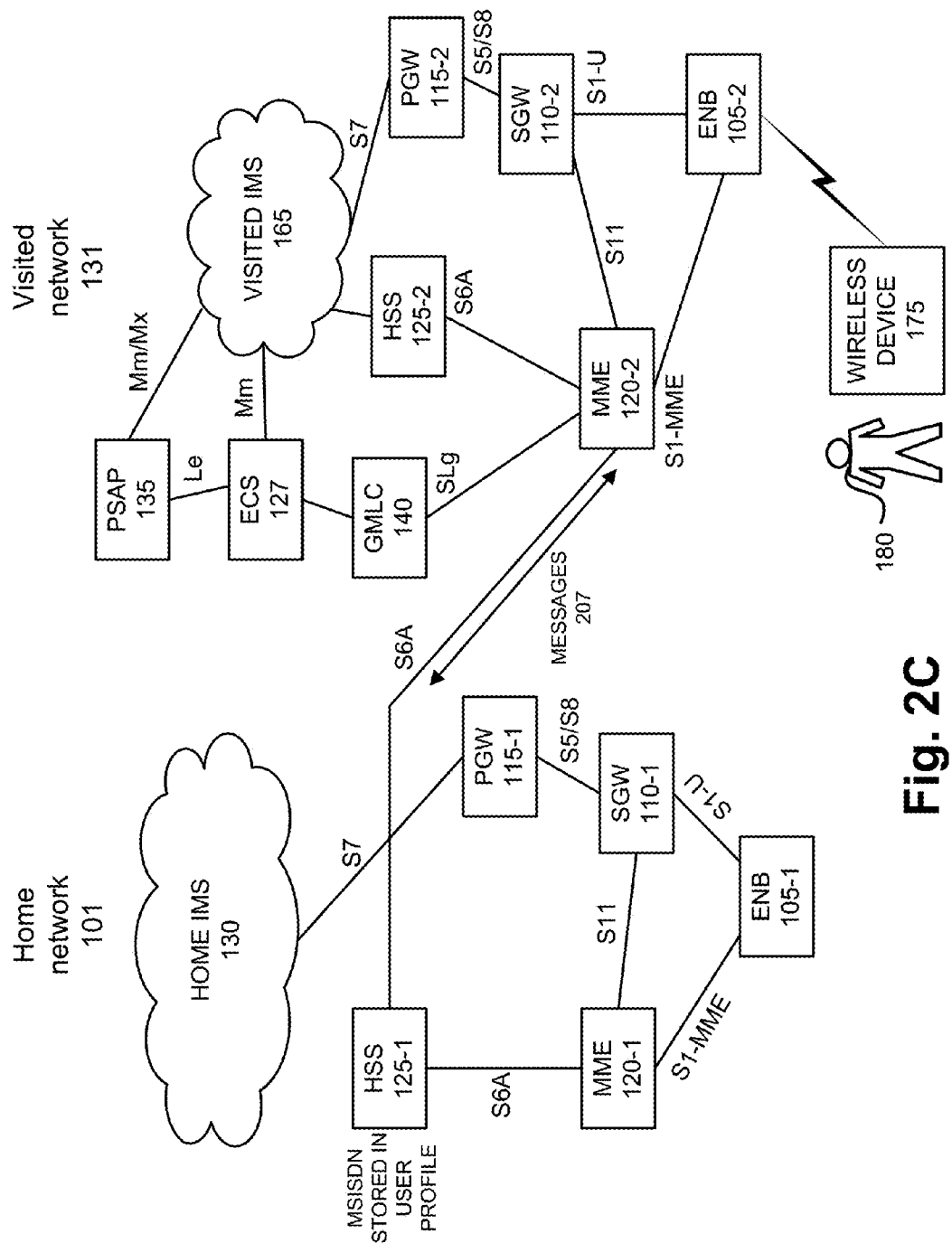

Referring to FIG. 2C, according to another exemplary implementation, MME 120-2 does not transmit the identifier and the MSISDN of user 180 to GMLC 140, in response to obtaining the MSISDN. Rather, MME 120-2 stores the MSISDN. Thus, in contrast to the implementation described in relation to FIG. 2B, MME 120-2 transmits the MSISDN to GMLC 140 only if user 180 places an emergency call.

Figure 2D:
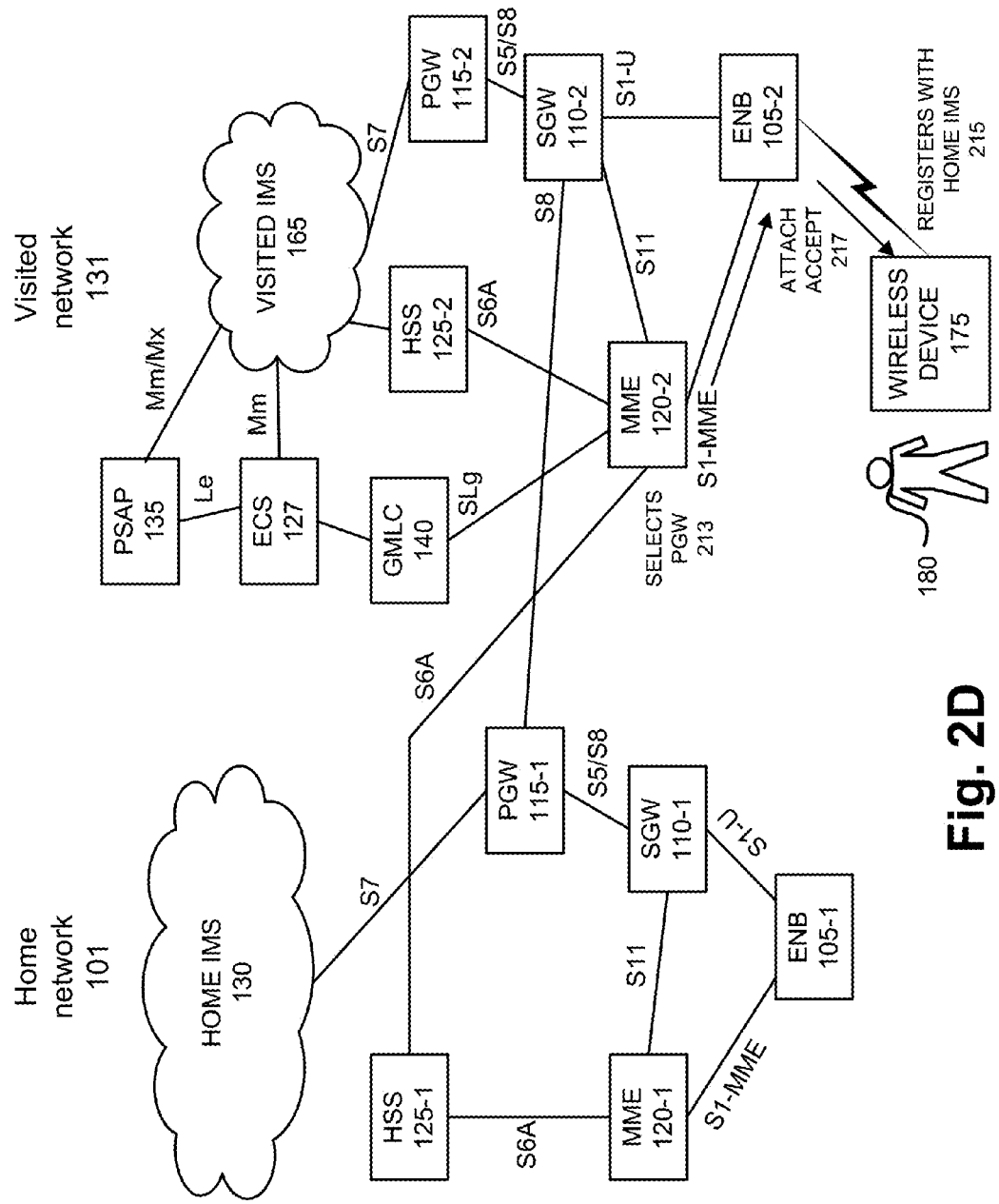

Referring to FIG. 2D, subsequent to messages 207, MME 120-2 selects a PGW (illustrated as selects PGW 213) of home network 101. For example, MME 120-2 may set the information element VPLMN Dynamic Address "Allowed" to "Not Allowed." A bearer for SIP signaling may be created between SGW 110-2 and PGW 115-1. After completion of the attachment procedure, wireless device 175/user 180 may register with home IMS 130 (illustrated as registers with home IMS 215). Home IMS 130 may provide nearly all IMS services (e.g., normal voice call, video call, Short Messaging Service (SMS), etc.). However, home IMS 130 does not provide emergency call service. According to an exemplary implementation, MME 120-2 transmits an attach accept message (illustrated as attach accept 217) to wireless device 175 in which the attach accept message includes an Emergency Service Support Indicator information element. Wireless device 175 may use this information as a basis for determining that an emergency VoLTE call is supported by visited IMS 165.

Figure 2E:
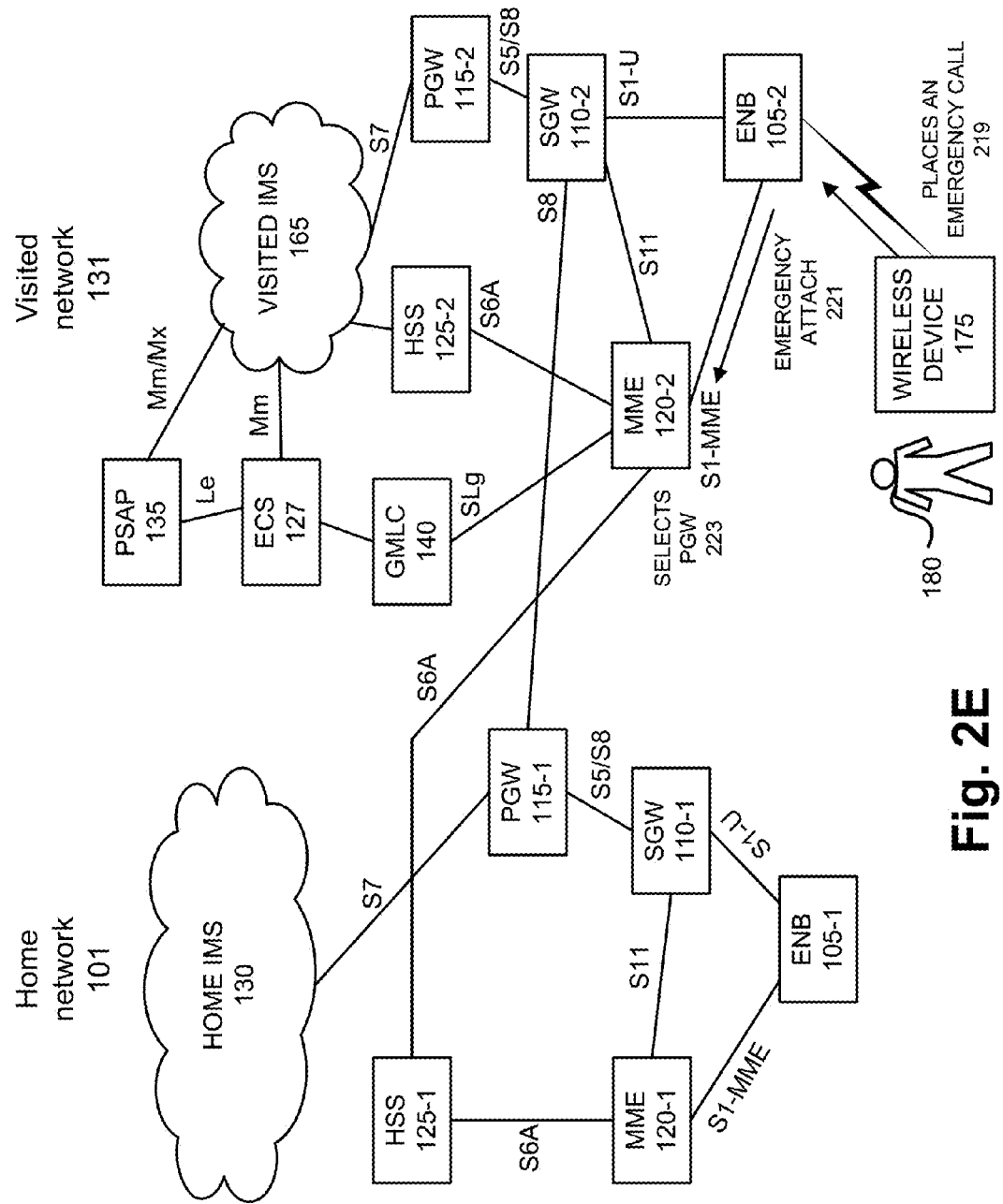
Figure 2F:
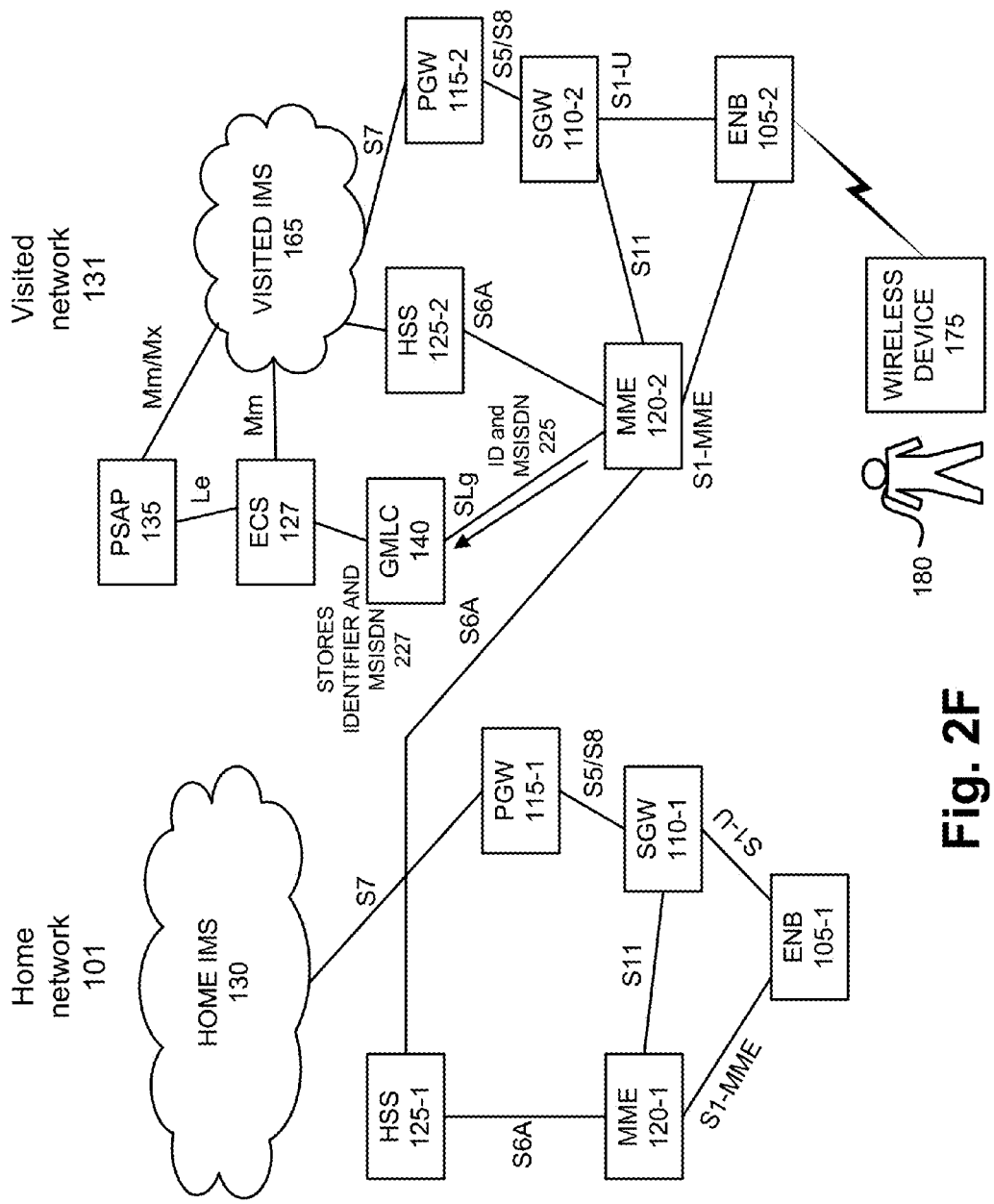

Referring to FIG. 2E, assume user 180 places an emergency call (e.g., dials 911) via wireless device 175 (illustrated as places an emergency call 219). According to this example, and in view of the attachment and registration described above, assume that user 180/wireless device 175 did not register with visited IMS 165 since an NNI does not exist between home IMS 130 and visited IMS 165. According to such circumstances, the emergency call may be considered an unauthenticated or anonymous emergency call.

Wireless device 175 transmits an emergency attach request to MME 120-2 (illustrated as emergency attach 221). The emergency attach request includes the IMEI of wireless device 175. The emergency attach request may also include the IMSI. As further illustrated, MME 120-2 selects a PGW so that an emergency bearer can be established (illustrated as selects PGW 223). For example, MME 120-2 selects PGW 115-2.

As previously described above in relation to FIG. 2C, MME 120-2 may not transmit the identifier and the MSISDN to GMLC 140. In continuity with this implementation, referring to FIG. 2F, in response to an emergency call having been initiated by user 180, MME 120-2 transmits the identifier and the MSISDN of wireless device 175/user 180 to GMLC 140 in one of the manners previously described (illustrated as ID and MSISDN 225). Consequently, GMLC 140 stores the identifier and the MSISDN in a database or a data structure (illustrated as stores identifier and MSISDN 227).

Figure 2G:
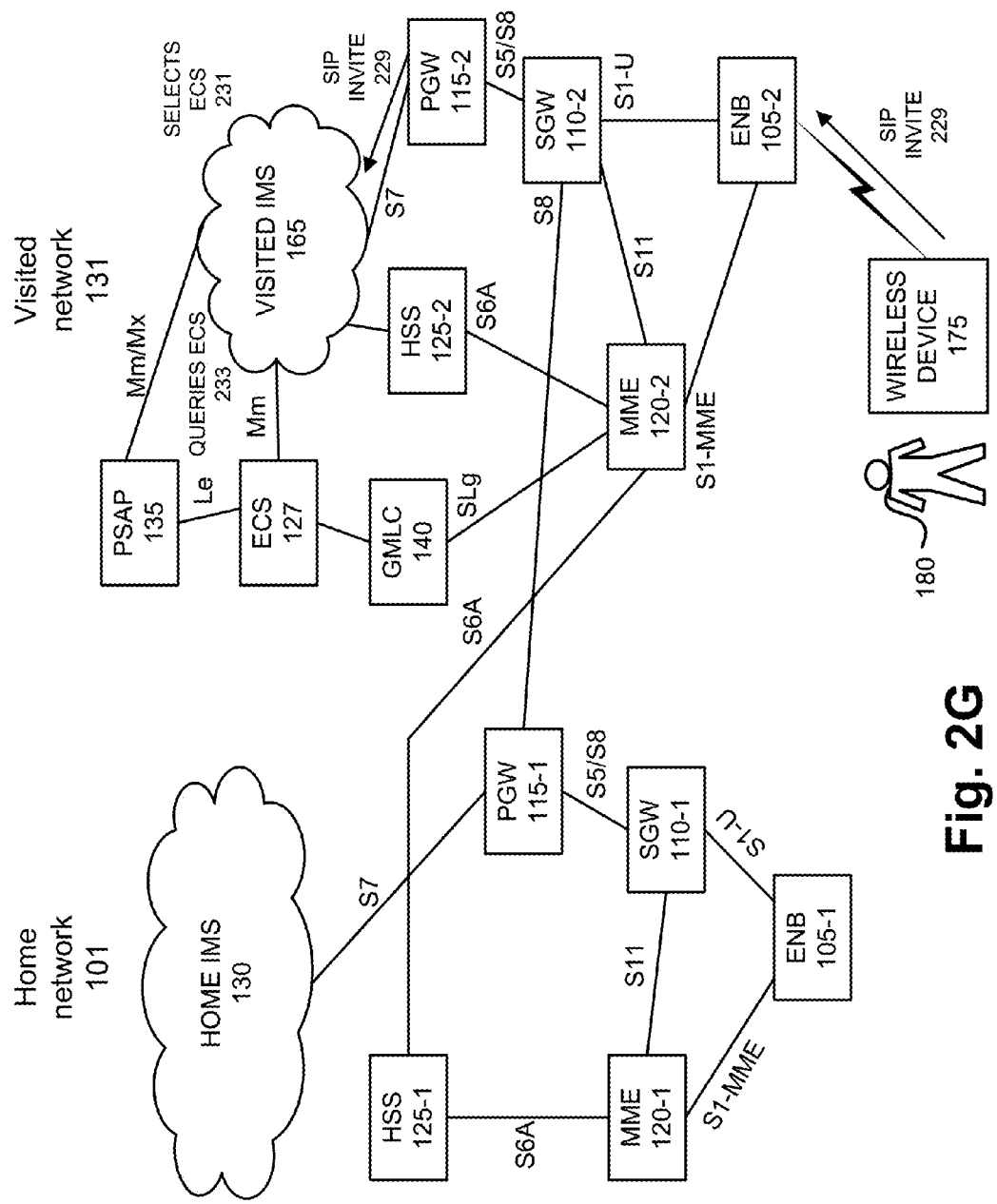

Referring to FIG. 2G, subsequent to an emergency PDN connection being established, wireless device 175 transmits a SIP Invite (illustrated as SIP Invite 229) that propagates to visited IMS 165. The SIP Invite includes an identifier (e.g., the IMEI). In response to receiving the SIP Invite, visited IMS 165 selects an ECS. For example, although not illustrated, a P-CSCF of visited IMS 165 may identify the SIP Invite as pertaining to an emergency call. In response, the P-CSCF selects an E-CSCF of visited IMS 165. The E-CSCF selects ECS 127 (illustrated as selects ECS 231). When location information is not included in the SIP Invite or additional location information is needed, the E-CSCF queries ECS 127 for routing instructions to the PSAP (illustrated as queries ECS 233). The location retrieval function of ECS 127 may include a routing determination function (RDF) that provides the routing information (e.g., a Uniform Resource Identifier (URI) of the PSAP) to the E-CSCF. In response, the E-CSCF routes the SIP Invite to the PSAP 135.

Figure 2H:
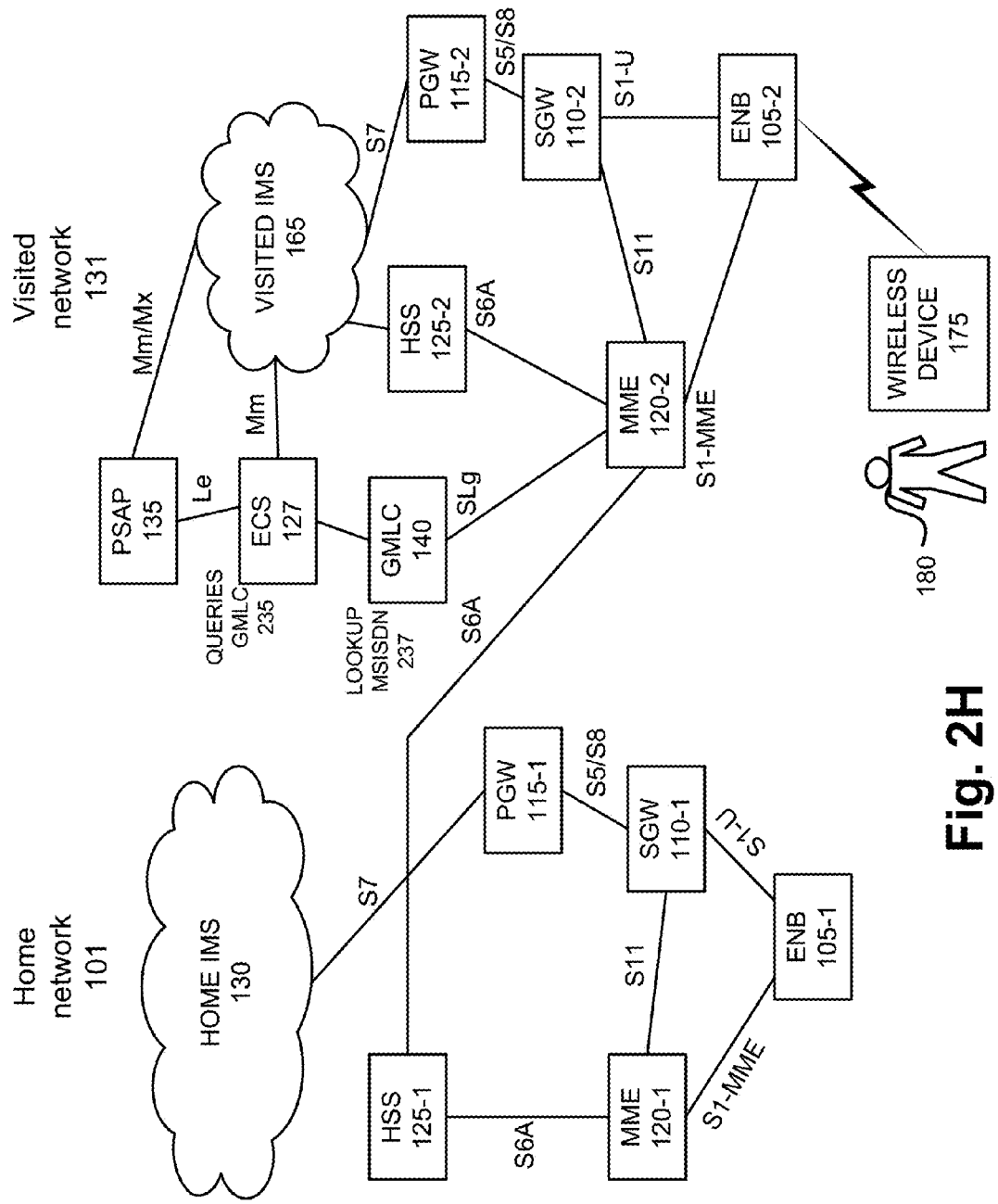

Referring to FIG. 2H, according to an exemplary embodiment, in response to receiving the query for routing information, ECS 127 queries GMLC 140 for the MSISDN (illustrated as queries GMLC 235). Depending on the number of GMLCs 140, ECS 127 may transmit one or multiple queries to one or multiple GMLCs 140. The query includes the identifier (e.g., the IMEI). In response to receiving the query, GMLC 140 performs a lookup for the MSISDN based on the IMEI (illustrated as lookup MSISDN 237). GMLC 140 transmits a response that includes the MSISDN to ECS 127. ECS 127 stores the MSISDN. According to an exemplary implementation, ECS 127 provides the MSISDN to PSAP 135 in response to a request for a location update from PSAP 135, as described further below. According to another exemplary implementation, ECS 127 transmits the MSISDN to PSAP 135 in response to receiving the MSISDN from GMLC 140.

Figure 2I:
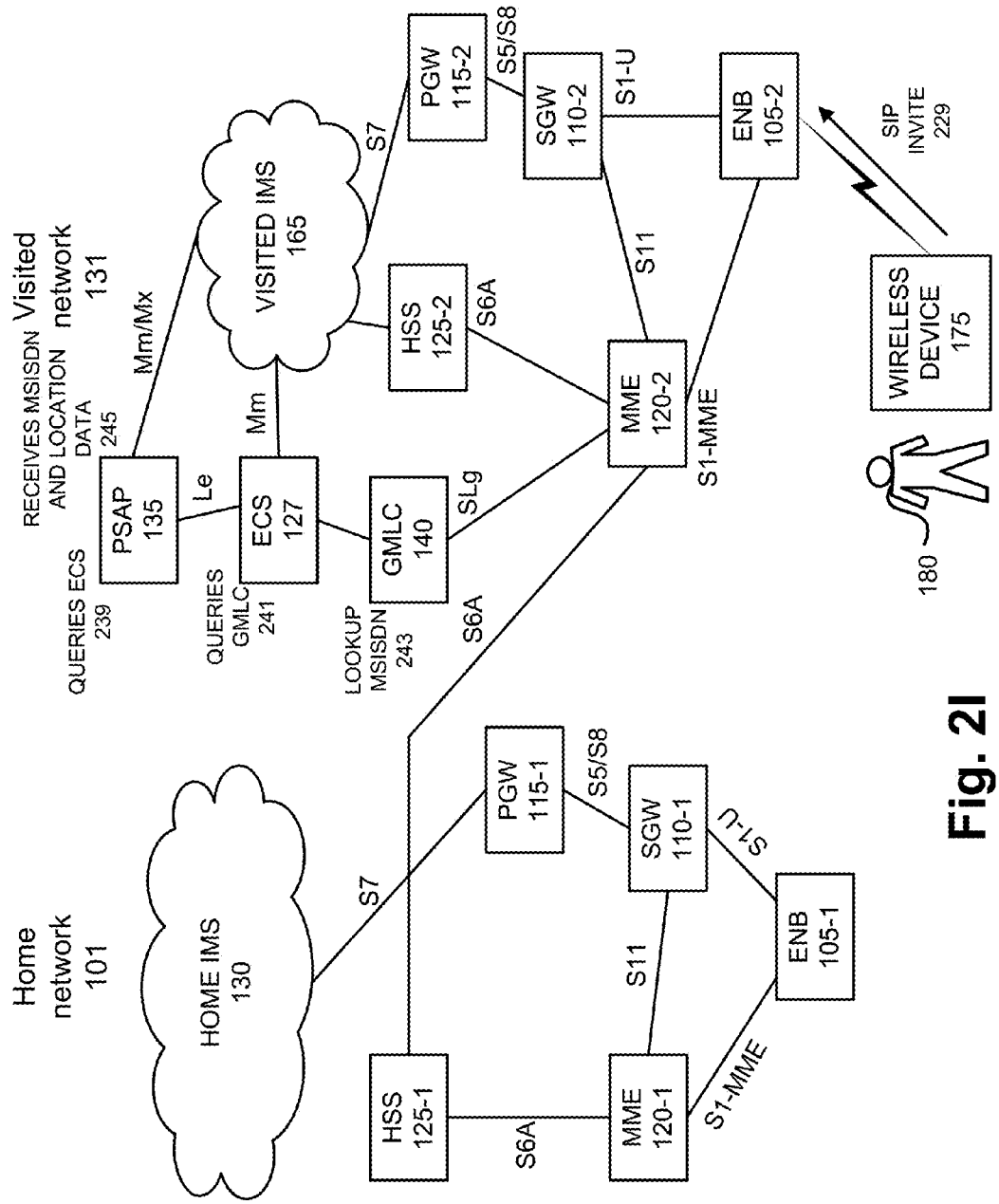
Figure 2J:
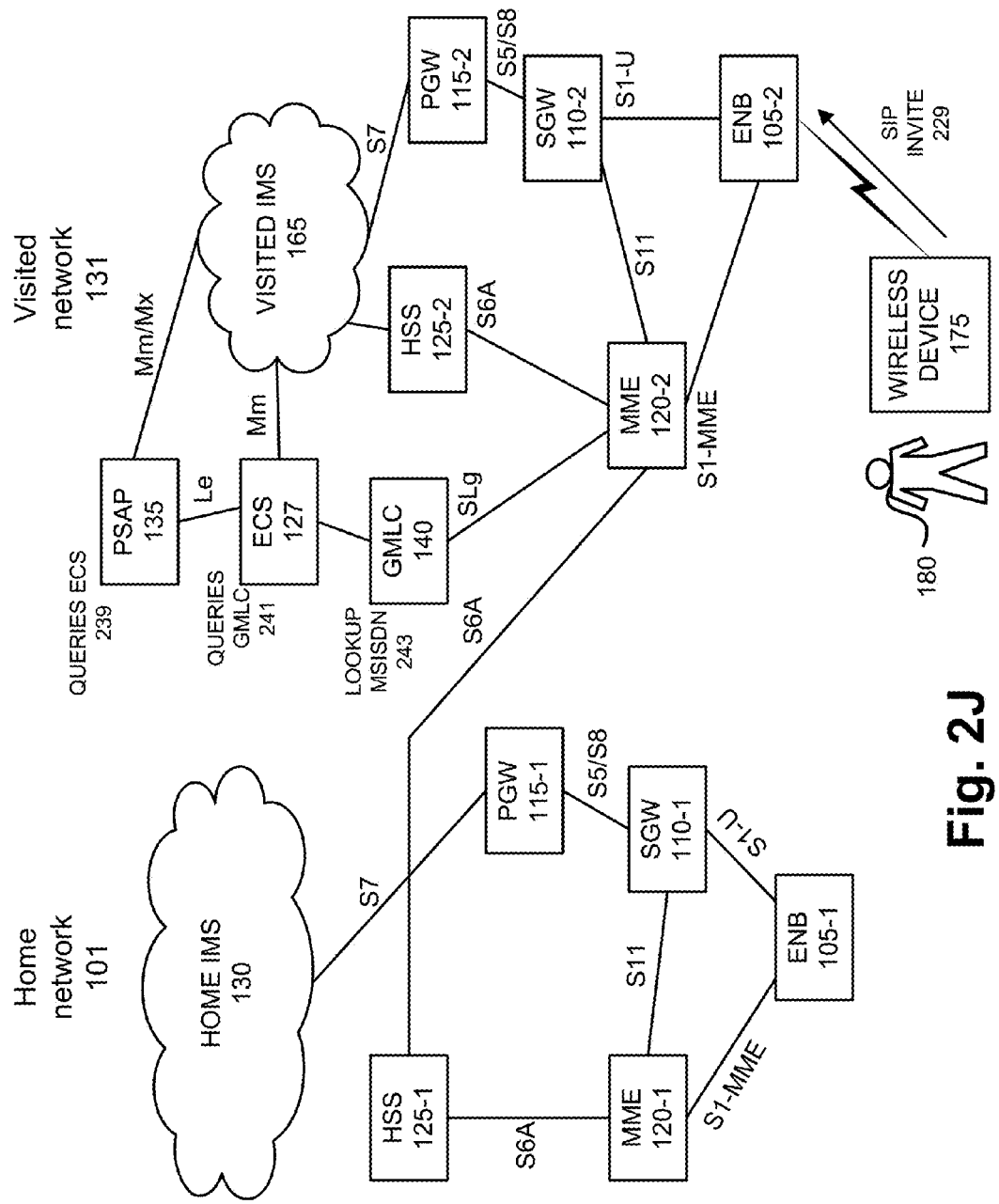

Referring to FIG. 2I, according to another exemplary embodiment, ECS 127 does not query GMLC 140 for the MSISDN in response to receiving the query for routing information. Rather, ECS 127 queries GMLC 140 for the MSISDN in response to receiving a query from PSAP 135. For example, PSAP 135 may query ECS 127 for a location update (illustrated as queries ECS 239). In response to receiving the query from PSAP 135, ECS 127 transmits one or multiple queries to obtain location data pertaining to wireless device 175/user 180 and the MSISDN (illustrated as queries GMLC 241). According to various implementations, ECS 127 may transmit two queries to GMLC 140 (i.e., one query for the location data and another query for the MSISDN). Alternatively, ECS 127 may initiate transmit a single query to GMLC 140 directed to both the location and MSISDN. Additionally, depending on the number of GMLCs, ECS 127 may transmit one or multiple queries to one or multiple GMLCs 140. In some cases, one GMLC 140 may provide the location data, while another GMLC 140 may provide the MSISDN. According to the various examples just described, the query includes an identifier (e.g., the IMEI). In response to receiving the query, GMLC 140 performs a lookup for the MSISDN based on the IMEI (illustrated as lookup MSISDN 243). GMLC 140 transmits a response that includes the MSISDN to ECS 127. GMLC 140 also transmits location data to ECS 127. PSAP 135 receives the MSISDN and the location data (illustrated as receives MSISDN and location data 245). PSAP 135 may now use the MSISDN of wireless device 175/user 180 in the event that the emergency call gets dropped or disconnected for any reason.

According to various implementations, PSAP 135 may be provided with various levels or granularities of location data. For example, one type of location data may be a cell identifier or cell center. According to another example, another type of location data may be GPS coordinates (e.g., latitude, longitude). GMLC 140 may obtain location data according to well-known or conventional techniques. According to an exemplary implementation, GMLC 140 may communicate with an Evolved Serving Mobile Location Center (E-SMLC). The E-SMLC may obtain location data pertaining to wireless device 175 via MME 120-2. For example, a network-based positioning procedure or user equipment (UE)-assisted positioning procedure may be used. According to various implementations, MME 120-2 may not transmit the MSISDN according to examples described in relation to FIGS. 2B and 2F. Rather, referring to FIG. 2J, MME 120-2 may transmit the MSISDN to GMLC 140 in response to receiving location/positioning requests from GMLC 140 or the E-SMLC. For example, the MSISDN and the IMEI may be carried in a positioning response, along with the location data. Depending on the implementation, PSAP 135 may initially be provided with a coarse level of location data, and subsequently, provided with a finer level of location data by MME 120-2.

Although FIGS. 2A-2J illustrate various embodiments of the emergency call support service, according to other embodiments, the emergency call support service may include an additional step, fewer steps, and/or a different step than the steps or operations described. For example, during the establishment of a VoLTE emergency call in which a communication link between a visiting IMS and a home IMS does not exist, the MME may indirectly provide the PSAP with the MSISDN in response to various triggering events. The MSISDN may be carried in various types of messages pertaining to the establishment of the VoLTE emergency call. Thus, according to other embodiments, the MME may transmit the MSISDN in response to other types of triggering events not specifically described herein. Additionally, or alternatively, the MSISDN may be carried in other types of messages not specifically described herein.

Figure 3:
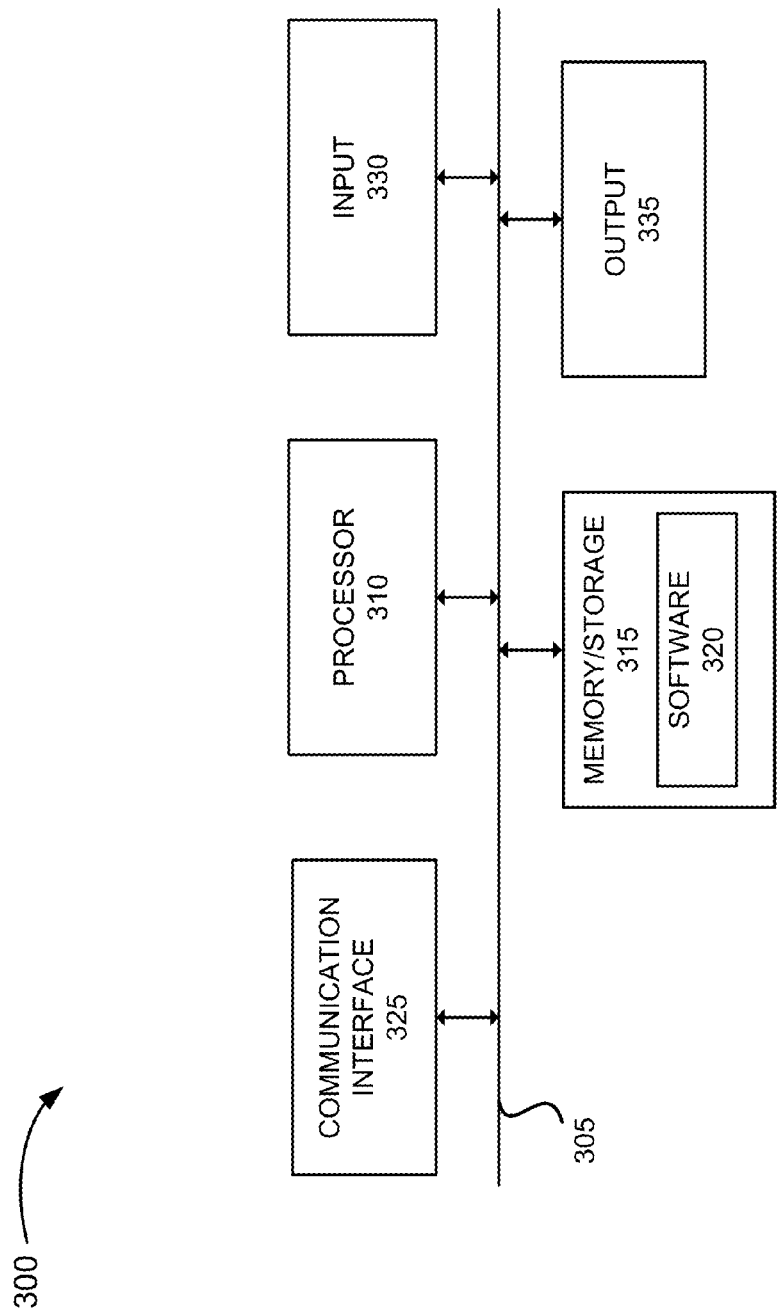
FIG. 3 is a diagram illustrating exemplary components of a device that may correspond to one or more of the devices in the exemplary environment.

FIG. 3 is a diagram illustrating exemplary components of a device 300. Device 300 may correspond to various network elements and devices depicted in environment 100. As illustrated in FIG. 3, according to an exemplary embodiment, device 300 includes a bus 305, a processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, MME 120-2, ECS 127, GMLC 140, and so forth, may include software 320 pertaining to the emergency call support service, as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, modulating, de-modulating, error correction, etc.).

Input 330 permits an input into device 300. For example, input 330 may include a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
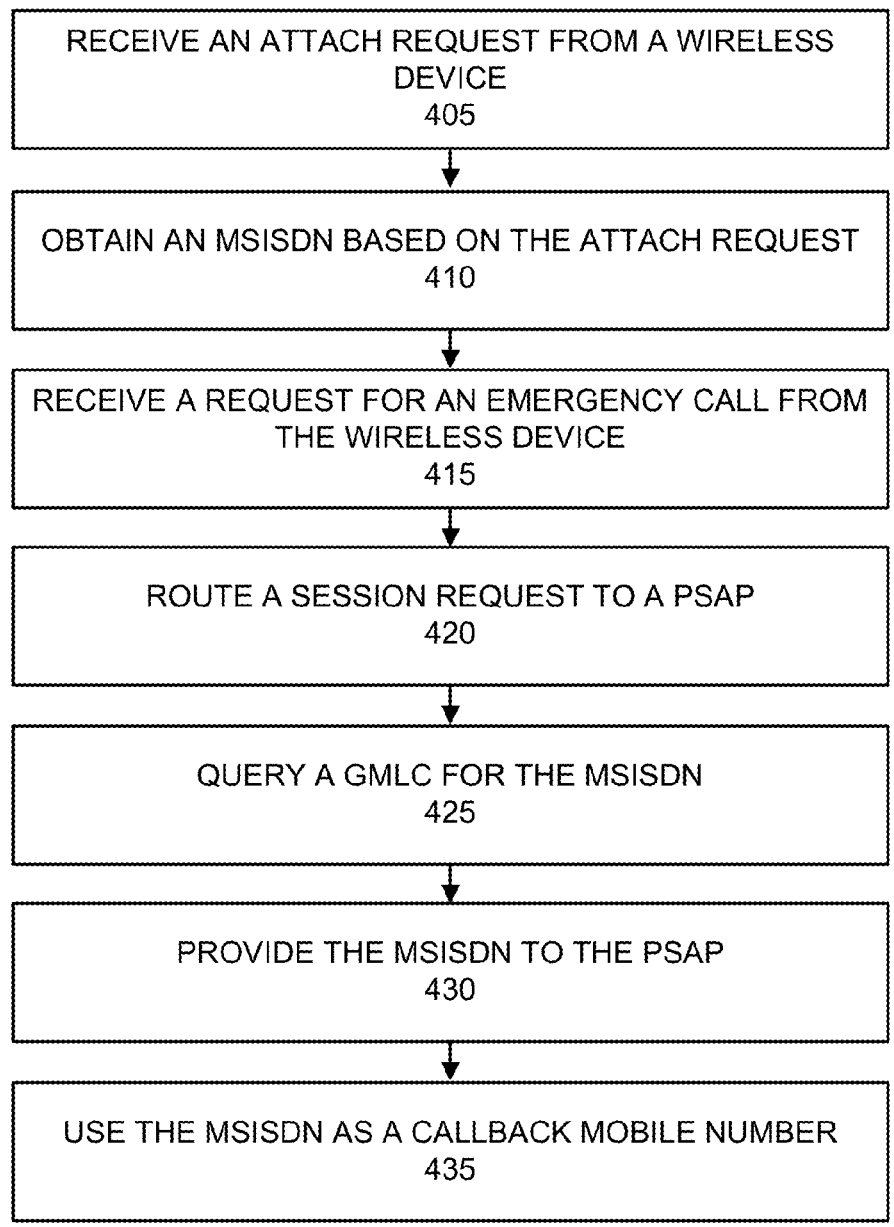
FIG. 4 is a flow diagram that illustrates an exemplary process pertaining to the emergency call support service.

FIG. 4 is a flow diagram that illustrates an exemplary process 400 pertaining to the emergency call support service. Process 400 is directed to a process previously described above with respect to FIGS. 2A-2J and elsewhere in this description, in which the MME obtains the MSISDN of wireless device 175 and provides the MSISDN to the PSAP during an establishment of an (unauthenticated/anonymous) emergency call. According to an exemplary embodiment, the MME performs some of the steps described in process 400. For example, processor 310 may execute software 320 to perform some of the steps described in process 400. It may be assumed that process 400 is performed in a wireless network that includes an S8HR architecture in which the home IMS and the visited IMS are not communicatively coupled (e.g., via an Mw interface).

Referring to FIG. 4, in block 405, process 400 begins with receiving an attach request from a wireless device. For example, a visited MME 120 of a visited network 131 receives an attach request, as a part of an attachment procedure, from a visiting wireless device 175 associated with user 180.

In block 410, an MSISDN is obtained based on the attach request. For example, the visited MME 120 obtains the MSISDN of the visiting wireless device 175 from HSS 125 of a home network 101. For example, as a part of an authentication and security procedure, the visited MME 120 uses an identifier (e.g., an IMEI, etc.) to query HSS 125. In response to the query, the visited MME 120 obtains the MSISDN. The visiting wireless device 175 attaches to visited network 131. The visiting wireless device 175 does not register with a visited IMS 165.

In block 415, a request for an emergency call from the wireless device is received. For example, the visited MME 120 receives an emergency attach request from the visiting wireless device 175. The visited MME 120 establishes an emergency PDN connection to a visited PGW of the visited network 131.

In block 420, a session request is routed to a PSAP. For example, the visited network receives a SIP Invite from the visiting wireless device 175. ECS 127 provides routing information to the visited IMS 165 that provides a network address of PSAP 135. The SIP Invite is routed to PSAP 135 based on the routing information.

In block 425, a GMLC is queried for the MSISDN. For example, ECS 127 queries GMLC 140 for the MSISDN. In block 430, the MSISDN is provided to the PSAP. For example, ECS 127 receives a response to the query that includes the MSISDN. ECS 127 provides the MSISDN to PSAP 135. In block 435, the MSISDN is used as a callback mobile number. For example, PSAP 135 uses the MSISDN as a callback mobile number to reach user 180 in the event that the emergency call is dropped or disconnected for any reason.

Although FIG. 4 illustrates an exemplary process 400, according to other embodiments, process 400 may include additional operations, fewer operations, and/or different operations than those illustrated in FIG. 4 and described herein. For example, according to various embodiments as previously described, MME 120 may provide the MSISDN based on various triggering events (e.g., receipt of a particular message, etc.) and/or during different stages of a session between the visiting wireless device 175 and the visited network 131.

The foregoing description of embodiments provides illustration, but is not intended to be exhaustive or to limit the embodiments to the precise form disclosed. In this regard, various modifications to the embodiments described herein may be implemented. Thus, specification and drawings are accordingly to be regarded as illustrative rather than restrictive. For example, although embodiments of the emergency call support service include operations performed by an MME, according to other embodiments, a Serving General Packet Radio Service (GPRS) Support Node (SSGN) may be implemented.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 310, etc.), or a combination of hardware and software (e.g., software 320). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 315.

No element, act, or instruction described in the present application should be construed as critical or essential to the embodiments described herein unless explicitly described as such.

What is claimed is:

1. A method comprising:

receiving, by a network device of a visited wireless network, an attach request from a wireless device to attach to the visited wireless network;

querying, by the network device for a mobile telephone number of the wireless device, an other network device of a home wireless network of the wireless device, based on the receiving, wherein the visited wireless network is communicatively coupled to the home wireless network of the wireless device;

obtaining, by the network device, the mobile telephone number of the wireless device from the other network device of the home wireless network of the wireless device, based on the querying;

receiving, by the network device, subsequent to an attachment of the wireless device to the visited wireless network, a request to establish an unauthenticated Voice over Long Term Evolution (VoLTE) emergency call, wherein the wireless device is not registered with a visited Internet Protocol Multimedia Subsystem (IMS) network, which is communicatively coupled to the visited wireless network, and wherein there is not a network-to-network interface between the visited IMS network and a home IMS network of the wireless device; and providing, by the network device, during an establishment of the unauthenticated VoLTE emergency call, the mobile telephone number to a public safety access point (PSAP).

2. The method of claim 1, wherein the network device is a mobility management entity (MME), and the providing further comprises:
transmitting, by the MME, the mobile telephone number to a gateway mobile location center (GMLC) in response to receiving the request.

3. The method of claim 1, further comprising:
transmitting, by an emergency call server, a query request, which is to a gateway mobile location center (GMLC), for the mobile telephone number, based on the request; and
receiving, by the emergency call server, a query response, which is responsive to the query request, from the GMLC, wherein the query response includes the mobile telephone number.

4. The method of claim 1, wherein the network device is a mobility management entity (MME).

5. The method of claim 1, further comprising:
receiving, by the network device, a location request from a gateway mobile location center (GMLC), and wherein the providing comprises:
transmitting, by the network device, a location response that includes the mobile telephone number, to the GMLC.

6. The method of claim 1, further comprising:
receiving, by an emergency call server, a query request from the PSAP; and
obtaining, by the emergency call server, the mobile telephone number from a gateway mobile location center (GMLC) in response to receiving the query request.

7. The method of claim 1, further comprising:
storing, by the network device, an identifier of the wireless device and the mobile telephone number, in response to the obtaining, wherein the mobile telephone number is a Mobile Station International Subscriber Directory Number (MSISDN), and wherein the identifier includes an International Mobile Station Equipment Identity (IMEI) of the wireless device.

8. The method of claim 1, wherein the providing comprises:
transmitting, by the network device, the mobile telephone number and an identifier of the wireless device to a gateway mobile location center (GMLC) in response to receiving the request;
receiving, by the GMLC, the identifier and the mobile telephone number;
storing, by the GMLC, the identifier and the mobile telephone number in response to the receiving of the identifier and the mobile telephone number; and
receiving, by the GMLC, a query request for the mobile telephone number, from an emergency call server, wherein the query request is received subsequent to the request being routed to the PSAP.

9. A network, wherein the network comprises:
a first network device of a visited wireless network comprising:
a first communication interface;
a first memory, wherein the first memory stores first instructions; and
a first processor, wherein the first processor executes the first instructions to:
receive, via the first communication interface, an attach request from a wireless device to attach to the first network device;
query, via the first communication interface to a second network device of a home wireless network of the wireless device, for a mobile telephone number of the wireless device, wherein the visited wireless network is communicatively coupled to the home wireless network of the wireless device;
obtain, via the first communication interface, the mobile telephone number of the wireless device from the second network device of the home wireless network of the wireless device, based on the query;
receive, via the first communication interface, subsequent to an attachment of the wireless device, a request to establish an unauthenticated Voice over Long Term Evolution (VoLTE) emergency call, wherein the wireless device is not registered with a visited Internet Protocol Multimedia Subsystem (IMS) network, which is communicatively coupled to the visited wireless network, and wherein there is not a network-to-network interface between the visited IMS network and a home IMS network of the wireless device; and
provide during an establishment of the unauthenticated VoLTE emergency call, the mobile telephone number to a public safety access point (PSAP).

10. The network of claim 9, wherein the first network device is a mobility management entity, and wherein when providing, the first processor further executes the first instructions to:
transmit, via the first communication interface, the mobile telephone number to a gateway mobile location center (GMLC) in response to a receipt of the request.

11. The network of claim 9, wherein the network further comprises:
a second network device of the visited wireless network comprising:
a second communication interface;
a second memory, wherein the second memory stores second instructions; and
a second processor, wherein the second processor executes the second instructions to:
transmit, via the second communication interface, a query request, which is to a gateway mobile location center (GMLC), for the mobile telephone number, based on the request; and
receive, via the second communication interface, a query response, which is responsive to the query request, from the GMLC, wherein the response includes the mobile telephone number.

12. The network of claim 9, wherein the visited wireless network is a Long Term Evolution (LTE) network or an LTE-Advanced network, and the first network device is a mobility management entity.

13. The network of claim 9, wherein the first processor further executes the first instructions to:
receive, via the first communication interface, a location request from a gateway mobile location center (GMLC), and wherein when providing, the first processor further executes the first instructions to:
transmit, via the first communication interface, a location response that includes the mobile telephone number, to the GMLC.

14. The network of claim 9, wherein the first processor further executes the first instructions to:
  store an identifier of the wireless device and the mobile telephone number, in response to an obtainment of the mobile telephone number, wherein the mobile telephone number is a Mobile Station International Subscriber Directory Number (MSISDN), and wherein the identifier includes an International Mobile Station Equipment Identity (IMEI) of the wireless device.

15. The network of claim 9, wherein the network further comprises:
  a second network device of the visited wireless network comprising:
    a second communication interface;
    a second memory, wherein the second memory stores second instructions; and
    a second processor, wherein the second processor executes the second instructions to:
      receive, via the second communication interface, a query request from the PSAP; and
      obtain, via the second communication interface, the mobile telephone number from a gateway mobile location center (GMLC) in response to receipt of the query request.

16. The network of claim 15, wherein the network further comprises:
  a third network device of the visited wireless network comprising:
    a third communication interface;
    a third memory, wherein the third memory stores third instructions; and
    a third processor, wherein the third processor executes the third instructions to:
      receive, via the third communication interface, from the first network device, the mobile telephone number and an identifier of the wireless device;
      store the identifier and the mobile telephone number in response to a receipt of the mobile telephone number and the identifier; and
      receive, via the third communication interface, a query request for the mobile telephone number from the second network device, wherein the query request is received subsequent to the request being routed to the PSAP, wherein the first network device includes a mobility management entity, the second network device includes an emergency call server, and the third network device includes the GMLC.

17. A non-transitory storage medium storing instructions executable by a processor of a device of a visited wireless network to:
  receive an attach request from a wireless device to attach to the device of the visited wireless network;
  query, for a mobile telephone number of the wireless device, to an other device of a home wireless network of the wireless device, based on the receipt of the attach request, wherein the visited wireless network is communicatively coupled to the home wireless network of the wireless device;
  obtain the mobile telephone number of the wireless device from the other device of the home wireless network of the wireless device, based on the query;
  receive subsequent to an attachment of the wireless device to the visited wireless network, a request to establish an unauthenticated Voice over Long Term Evolution (VoLTE) emergency call, wherein the wireless device is not registered with a visited Internet Protocol Multimedia Subsystem (IMS) network, which is communicatively coupled to the visited wireless network, and wherein there is not a network-to-network interface between the visited IMS network and a home IMS network of the wireless device; and
  provide during an establishment of the unauthenticated VoLTE emergency call, the mobile telephone number to a public safety access point (PSAP).

18. The non-transitory storage medium of claim 17, wherein the instructions further comprise instructions to:
  transmit the mobile telephone number to a gateway mobile location center (GMLC) in response to a receipt of the request.

19. The non-transitory storage medium of claim 17, wherein the instructions further comprise instructions to:
  store an identifier of the wireless device and the mobile telephone number, in response to an obtainment of the mobile telephone number, wherein the mobile telephone number is a Mobile Station International Subscriber Directory Number (MSISDN), and wherein the identifier includes an International Mobile Station Equipment Identity (IMEI) of the wireless device.

20. The non-transitory storage medium of claim 17, wherein the instructions further comprise instructions to:
  receive a location request from a gateway mobile location center (GMLC), and wherein the instructions to provide further comprise instructions to:
  transmit a location response that includes the mobile telephone number, to the GMLC.

* * * * *